INVENTOR.
WILLIAM R. DUNN
BY
Alan M. Staubly
ATTORNEY.

United States Patent Office 3,459,215
Patented Aug. 5, 1969

3,459,215
PRESSURE REGULATOR VALVE WITH REVERSED COIL SPRING
William R. Dunn, Los Angeles, Calif., assignor to Honeywell Inc., Minneapolis, Minn., a corporation of Delaware
Filed Oct. 4, 1967, Ser. No. 672,814
Int. Cl. F16k *31/365*
U.S. Cl. 137—505.25      6 Claims

ABSTRACT OF THE DISCLOSURE

A pressure regulator including a diaphragm operated valve that is normally biased open by a spring. The diaphragm is positioned to respond to outlet pressure to adjust the valve's position to maintain a uniform outlet pressure and the loading spring is a conical compression spring doubly stressed by reversing or inverting its end positions, placing the free end in tension with a rod between it and the diaphragm valve.

Related applications

This application discloses an improvement over the pressure regulator disclosed in the applicant's copending application Ser. No. 447,410 for "Control Apparatus," filed Apr. 12, 1965, now Patent No. 3,372,707.

Background of the invention

Pressure regulators are well known. Generally they include a valve body with a tubular stack thereon in which a long compression spring is located. Various designs have been made to reduce the valve body height due to the spring requirements. One of such designs places the axis of the spring parallel with the diaphragm in its housing or sidewise on the valve body, with a lever extending between the spring and the diaphragm. This invention provides a simpler solution to the problem.

Brief summary of the invention

A pressure operated valve having a movable-wall actuated valve and an inverted conical spring with the free end thereof placed in tension and operably connected to said valve.

Detailed description

Figure 1:
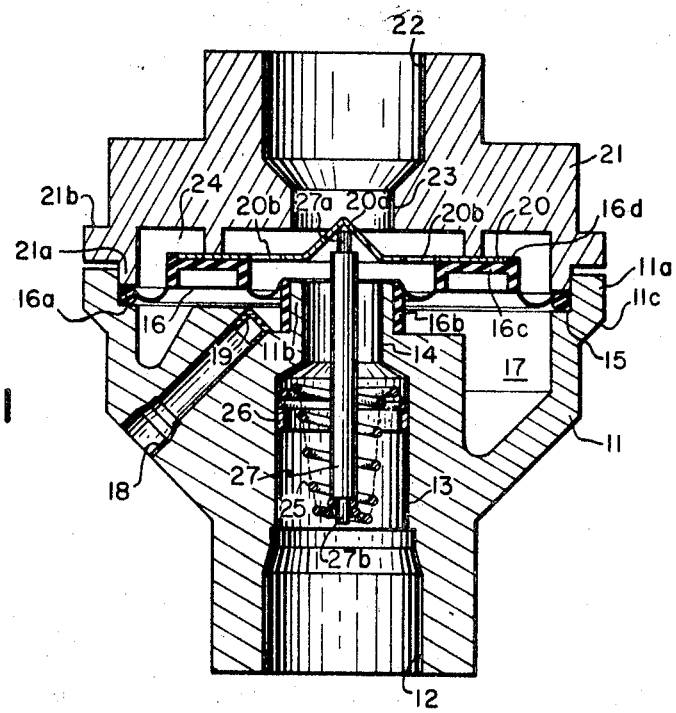
FIGURE 1 is a vertical sectional view of the invention.

The pressure regulator includes a body portion 11 having an inlet 12, which may be threaded if desired, and a stepped bore 13 and 14 leading from the inlet 12 to the opposite end of the body portion. An annular shoulder 15 is provided adjacent an annular projection 11a of the valve body 11 for the reception of a bead 16a around the periphery of a flexible diaphragm 16. A sleeve-like projection 11b forms an extension of the bore 14 and provides a chamber 17 between it and the body portion 11a. A bore 18 extends from the outer surface of the body portion 11 to the chamber 17 and is partially closed at the inner end thereof by means of an orifice cup 19, which provides a restricted atmospheric vent for the chamber 17.

The diaphragm 16, besides having an annular bead 16a around its outer periphery, also has an integral, centrally-disposed, sleeve-like portion 16b which tightly fits around the projection 11b, to make a gas-tight seal therewith and to provide a valve seat. Intermediate the bead 16a and the sleeve 16b, the diaphragm has a heavier molded portion 16c that is recessed at 16d to receive a metallic valve disc 20.

The disc 20 has an upwardly struck centering socket 20a and a plurality of apertures 20b around the socket for the passage of fluid from the inlet 12 to the upper side of the valve disc, when the disc is spaced from the upper end of the sleeve 16b. The disc 20 is cemented or otherwise secured to the diaphragm 16 so that the two move together.

A second body portion 21 has an outlet 22, that may be threaded, and a bore 23 that extends from the outlet 22 to a recess or chamber 24. An annular rib 21a has an outside diameter nearly equal to the inside diameter of the extension 11a so that when the two body portions 21 and 11 are nested together, the rib 21a compresses and seals against the bead 16a and the bead in turn against the shoulder 15 to provide a gas-tight seal between the bead and each of the body portions. The two body portions may be fixedly secured together either by means of bolts (not shown) or by a clamp ring (not shown) extending around the two body portions and over the shoulders 11c and 21b.

Figure 2:
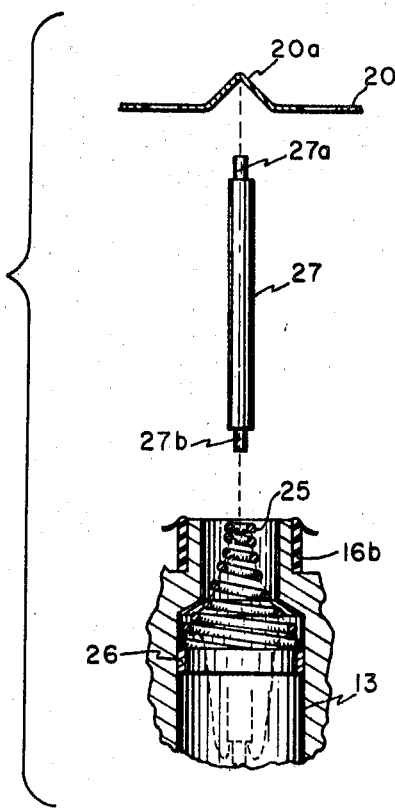
FIGURE 2 is a fragmentary and exploded view thereof.

The valve 20 and diaphragm 16 are normally biased away from the valve seat 16b by means of a conical coil-spring 25 which normally has the shape shown in FIGURE 2 of the drawing. The diameter of the wire forming the coils of the spring is considerably smaller than that illustrated in the drawing so that the outside diameter of each of the coils, except the two coils at each end of the spring, enables each coil to pass through the next adjacent larger coil. The larger diameter end of the spring is fixed in the bore 13 by means of a ring 26 which has an interference fit in the bore 13. A rod 27 having a reduced diameter projection 27a and 27b, one at each end thereof, is positioned between the smaller diameter end of the spring with the portion 27b extending into the small diameter end of the spring and with the portion 27a centered in the bottom of the socket 20a.

As can be seen from FIGURE 2 of the drawing, the exploded view of the elements prior to assembly, the parts are placed in the assembled position shown in FIGURE 1 by inserting the lower end of the rod 27 in the small end of the spring, by placing the socket of the valve over the upper end of the rod 27, and by forcing the small end of the spring and rod downwardly through the coils of the spring 25 until the body portion 21 nests in the body portion 11. This places the intermediate coils of the spring in tension, as shown in FIGURE 1, so that the spring will tend to keep the lower end of the rod 27 centrally disposed in the bore 13. Not only is the spring fully compressed from the position shown in FIGURE 2 to the plane of the ring, it is further compressed or stressed to the dotted line position shown in FIGURE 2 and to the assembled position shown in FIGURE 1. This provides substantially a doubling of the loading of the spring by a spring height or length that would normally be just a regular spring height. This invention therefore provides for either a doubling of the loading of the spring for a fixed height or for the reduction in the height of a valve which houses the valve spring for a normal loading.

In the operation of the valve, gas, or any other fluid to be controlled by the regulator, will enter the inlet 12, pass through the coils of the spring, pass the valve seat 16b and through apertures 20b to the outlet 22. Due to the fact that the total pressure on the area of the diaphragm and valve exposed to the outlet pressure being greater than the atmospheric pressure on the other side of the diaphragm and the inlet pressure on the valve disc, the valve will throttle with respect to the valve seat 16b against the spring bias to maintain a uniform pressure at the outlet.

It will thus be seen that the particular spring arrangement provided by this invention not only enables the size of the valve body to be smaller than conventional valve bodies but also provides a much more stable loading of the diaphragm of the regulator, due to the fact that the spring is better centered and directs a better centered force against the valve and its associated diaphragm.

The embodiments of the invention in which an exclusive property or right is claimed are defined as follows:

1. A pressure operated valve comprising a valve body having an inlet and an outlet and a valve seat therebetween, a valve cooperable with said seat to control fluid flow through said seat, a movable-wall operably engaging said valve and exposed to the fluid in said valve body, and a generally cone-shaped coil spring with one end fixed in said valve body and prestressed to the position wherein the other end thereof on the opposite side of said one end is displaced through the one end into a reversed position from its normal position and said other end is operably connected to said valve, said other end remaining in said displaced reversed position throughout the normal operation of said valve.

2. A pressure operated valve as defined in claim 1 wherein said one end is the larger end and said other end is the smaller end and a rod extends from said smaller end and through said coil to said valve.

3. A valve as defined in claim 1 wherein said movable wall is a flexible diaphragm.

4. A valve as defined in claim 3 wherein said spring coils are so stressed that the smaller end of the spring is spaced a substantial coaxial distance from said larger end so that the ends are biased toward each other and said rod is held centered in the coil.

5. The pressure operated valve defined in claim 1 wherein the spring has more than four coils and the last two coils at each end of the spring are of substantially the same diameter so that their normal relative positions are not reversed when the smaller end of the spring is projected through the larger end when the valve is assembled.

6. The valve of claim 5 wherein the movable wall is a flexible diaphragm and a rod extends between the spring and the valve.

References Cited
UNITED STATES PATENTS

| | | | |
|---|---|---|---|
| 582,432 | 5/1897 | O'Neil | 137—505.25 |
| 2,876,793 | 3/1959 | Vanderpoel | 137—505.42 |
| 3,165,097 | 1/1965 | Lowther | 137—483 XR |
| 3,359,960 | 12/1967 | Pittsley | 137—480 XR |
| 3,379,213 | 4/1968 | Billington | 137—517 XR |

HAROLD W. WEAKLEY, Primary Examiner

U.S. Cl. X.R.

267—1